UNITED STATES PATENT OFFICE.

ROBERT M. SMITH, OF BALTIMORE, MARYLAND.

IMPROVED MODE OF UTILIZING THE WASTE ACID FROM PETROLEUM-REFINERIES.

Specification forming part of Letters Patent No. 42,803, dated May 17, 1864.

*To all whom it may concern:*

Be it known that I, ROBERT M. SMITH, of the city and county of Baltimore, and State of Maryland, have invented or discovered a new and useful process in utilizing the sulphuric acid that has been used in purifying or refining of petroleum or coal oils by applying the acid in the manufacture of salts of various kinds, of which the following is a specification.

Attempts have been made to recover the sulphuric acid that had been previously used in the refining of coal-oils; but the attempts have failed to produce anything of commercial or of manufacturing value.

My invention consists, not in recovering the acid in its original condition, but in utilizing it in the condition in which it comes from the tanks, with all the noxious odors contained in it, which are, however, driven off in my process, and thus I economize an article hitherto deemed of no value from the difficulty of divesting it of its offensive odor.

To enable others skilled in the art to make and use my invention, I will proceed to describe the process.

I take the foul acid and combine with it iron, copper, magnesia, or other base. The acid may be diluted with water or used in the condition in which it comes from the oil-vats, and with or without heat. When the chemical action has gone as far as desired the resulting liquid, either by itself or mixed with the sediment, if any remain in the vessel, is to be boiled down to dryness and exposed to heat sufficient to drive off the oil or noxious odors that it may contain, and when these have been nearly or entirely driven off or disappeared water, either hot or cold, is added to the mass to dissolve the soluble salts, and the solution allowed to stand until it settles clear or is strained off, and after being concentrated by boiling allowed to cool and deposit the desired salt. The liquor may be concentrated either before or after being drawn off from the sediment. This noxious and fetid acid thus saved, after refining coal-oils with it, may also be used for making the sulphate of soda in the preparation of soda-ash, by a similar process, and is susceptible of many other uses when mixed with a base, boiled down, and then heated and burned to drive off the foul odor.

Having thus fully described the nature, object, and purpose of my discovery, what I claim as new, valuable, and useful therein is—

The utilizing of the sulphuric acid that had been previously used for refining petroleum or coal oils, and which contains foul and noxious odors, by applying the acid in the manufacture of salts of various kinds and burning out the oil or fetid matter, substantially as herein described.

ROBT. M. SMITH.

Witnesses:
W. T. ARNOLD,
M. SMITH, Jr.